(12) United States Patent
Stephan et al.

(10) Patent No.: US 10,924,463 B2
(45) Date of Patent: Feb. 16, 2021

(54) DELEGATING INTERMEDIATION ON AN EXCHANGE OF ENCRYPTED DATA

(71) Applicant: Orange, Paris (FR)

(72) Inventors: Emile Stephan, Pleumeur Bodou (FR); Nathalie Omnes, Trebeurden (FR)

(73) Assignee: ORANGE, Paris (FR)

( * ) Notice: Subject to any disclaimer, the term of this patent is extended or adjusted under 35 U.S.C. 154(b) by 133 days.

(21) Appl. No.: 15/525,187

(22) PCT Filed: Oct. 28, 2015

(86) PCT No.: PCT/FR2015/052910
§ 371 (c)(1),
(2) Date: May 8, 2017

(87) PCT Pub. No.: WO2016/071607
PCT Pub. Date: May 12, 2016

(65) Prior Publication Data
US 2018/0288017 A1    Oct. 4, 2018

(30) Foreign Application Priority Data

Nov. 7, 2014 (FR) ..................... 14 60827

(51) Int. Cl.
*H04L 29/06* (2006.01)
*H04L 29/08* (2006.01)

(52) U.S. Cl.
CPC ...... *H04L 63/0471* (2013.01); *H04L 63/0272* (2013.01); *H04L 63/0457* (2013.01);
(Continued)

(58) Field of Classification Search
CPC ............. H04L 63/0471; H04L 63/0272; H04L 63/0457; H04L 63/168; H04L 67/28; H04L 67/02
See application file for complete search history.

(56) References Cited

U.S. PATENT DOCUMENTS 9,084,234 B2    7/2015  Kolbe et al.
2004/0143738 A1* 7/2004  Savage ............... G06Q 20/383
                                                          713/168
(Continued)

FOREIGN PATENT DOCUMENTS

EP           2647169 A1     10/2013

OTHER PUBLICATIONS

International Search Report and Written Opinion dated Feb. 2, 2016 for corresponding International Application No. PCT/FR2015/052910, filed Oct. 28, 2015.
(Continued)

*Primary Examiner* — Malcolm Cribbs
*Assistant Examiner* — Bassam A Noaman
(74) *Attorney, Agent, or Firm* — David D. Brush; Westman, Champlin & Koehler, P.A.

(57) ABSTRACT

A method, a device and a program are provided for processing data. The method is implemented within an intermediary module. The data is transmitted between a customer module and a server module connected through a communications network. The method includes: receiving, from one among the customer and server modules, an intermediation request identifying an operation of intermediation to be performed relative to a stream of encrypted data exchanged between the customer module and the server module; and processing relative to said encrypted data as a function of said operation of intermediation.

12 Claims, 2 Drawing Sheets

Figure 1:
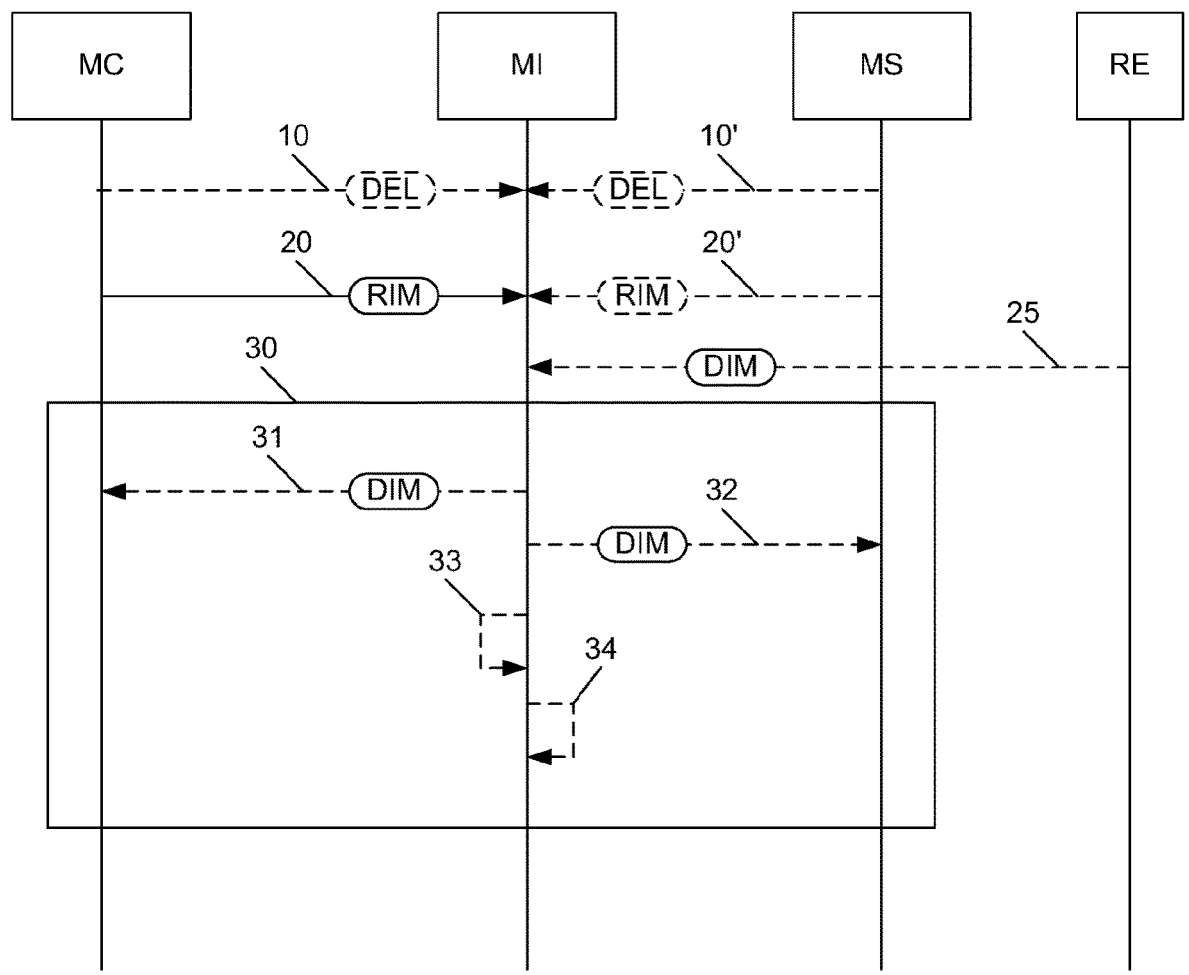

(52) U.S. Cl.
CPC ............ *H04L 63/168* (2013.01); *H04L 67/28* (2013.01); *H04L 67/02* (2013.01)

(56) References Cited

U.S. PATENT DOCUMENTS

| | | | |
|---|---|---|---|
| 2007/0245414 A1* | 10/2007 | Chan | H04L 63/0823 726/12 |
| 2009/0193126 A1 | 7/2009 | Agarwal et al. | |
| 2013/0339472 A1 | 12/2013 | Ruellan et al. | |
| 2014/0122578 A1* | 5/2014 | Lee | H04L 67/42 709/203 |
| 2014/0250164 A1 | 9/2014 | Marx et al. | |
| 2014/0310429 A1 | 10/2014 | L'Heureux et al. | |
| 2015/0067027 A1* | 3/2015 | Liu | H04L 67/1027 709/203 |
| 2015/0117200 A1* | 4/2015 | Patel | H04L 47/27 370/235 |
| 2016/0105374 A1* | 4/2016 | Thackray | H04L 67/02 709/226 |

OTHER PUBLICATIONS

English Translation of Written Opinion of the International Searching Authority dated Feb. 9, 2016 for corresponding International Application PCT/FR2015/052910, filed Oct. 28, 2015.
French Search Report and Written Opinion dated Aug. 28, 2015 for corresponding French Application No. 1460827, filed Nov. 7, 2014.
Fielding, R. et al. "Hypertext Transfer Protocol (HTTP/1.1): Message Syntax and Routing". greenbytes, 2014. Web. Jun. 2014, RFC 7230.

\* cited by examiner

DELEGATING INTERMEDIATION ON AN EXCHANGE OF ENCRYPTED DATA

CROSS-REFERENCE TO RELATED APPLICATIONS

This Application is a Section 371 National Stage Application of International Application No. PCT/FR2015/052910, filed Oct. 28, 2015, which is incorporated by reference in its entirety and published as WO 2016/071607 A1 on May 12, 2016, not in English.

1. FIELD OF THE INVENTION

The present technique relates to the securing of communications, and more particularly to a method for ensuring confidentiality of data exchanged between a client or customer device and a server device, typically transmitted on an Internet-type meshed network. In such networks, a certain number of actors come into action. Thus, an access provider is an entity offering users means of access to its network. A user is a client or customer of the access provider. This user may wish to use the network of the access provider to access one or more services or contents. Such services or contents are then delivered by a service provider or a content provider (typically in the form of a customer-server relationship) through the network of the access provider.

2. PRIOR ART

Recent disclosures and revelations about the massive collection and exploitation of private data by government agencies and major corporations have raised questions about the need to protect personal information.

To rebuild trust among users, the IETF (Internet Engineering Task Force) and the content and service providers are seeking to achieve general and widespread encryption of Internet traffic. Such encryption can be applied to all transported services, whether they relate to the TCP (Transmission Control Protocol) with TLS (Transport Layer Security), or to the UDP (User Datagram Protocol) with DTLS (Datagram Transport Layer Security) especially in WebRTC (Web Real-Time Communication). Such encryption can also be applied to web traffic with systematic use of HTTPS (Hyper-Text Transfer Protocol Secure) by the content and service providers (such as Google®, Facebook®, Twitter® and Amazon®).

Thus, the encryption of traffic by means of HTTPS, TLS or DTLS protocols is becoming widespread. It is thus estimated that nearly half of the traffic is already encrypted.

From the user's viewpoint, such encryption has advantages in principle. Such encryption ensures a certain degree of confidentiality of data transmitted and can rebuilt lost trust towards service providers.

By contrast, such encryption challenges a certain number of principles especially the operating principles used by access providers. Thus, a classic architecture based on the HTTP protocol (especially in its version 1.1, cf. section 2 of the document RFC 7230) natively integrates third-party proxy servers (intermediaries) especially to provide a caching function (see version 14 of the draft "draft-ietf-httpbis-http2"). Such a function is for example useful for accelerating the loading of contents often accessed by users. The use of the TLS, DTLS or HTTPS protocols intrinsically protects the connection from third-party intrusion and therefore does not enable caching of a content by a third party, especially by the proxy of the access provider. The result of this is a deterioration of performance for the user and an increase in the load constituted by international links.

In addition, these proxy servers are also useful for carrying out other actions such as analyzing packets, measuring the audience of a content, carrying out measurements needed for invoicing or authentication of the client, which are all so many actions jeopardized by the use of the TLS, DTLS or HTTPS protocols. In particular, these proxy servers are used to enrich or augment the content. This is done either by enriching the requests coming from the customer or by enriching the responses coming from the server. In the same way as with the caching, the encryption of the transport (by TLS, DTLS, HTTPS, or even a TCP extension) does not enable the proxy of the access provider to modify the content of these requests or of these responses since the information is encrypted and therefore inaccessible to the proxy. Once again, this leads to a deterioration of performance for the user: these additions of information are indeed quite useful, both for the customer and for the server (of the content provider or the service provider) for example in order to authenticate the user, adapt the content transmitted, the type of service available etc. For example, such enriching enables the format of a content to be adapted according to the available bandwidth.

These problems are increased by the use of a new version of the HTTP protocol. In fact, a version 2 of the HTTP protocol (also called HTTP2) is now beginning to be implemented by content providers or service providers. Using this new version of the HTTP protocol, the content providers or service providers are deploying their own HTTP2 proxies to which the terminals link up through the TLS protocol.

With the use of the HTTP2 protocol, the connections to the different domains are multiplexed in a single TCP connection encrypted with TLS. It is therefore no longer possible to differentiate the services (either for the counting functions or for stream control necessary to supply quality of service adapted for each service) or to insert signaling information elements into the stream (needed to communicate metadata or needed for the network). Nor, moreover, is it any longer possible to provide this information to other partners. The HTTP2 protocol thus impacts especially on the proxies of the operators, especially those based on the interception of data and in charge of carrying out deep inspections of packets (for example, DPI or Deep Packet Inspection) but also those working through the HTTP1.1 protocol as soon as the content providers or service providers use their own proxies using encryption between the customer and the server, for example with the TLS protocol.

There is, therefore, a need to provide a solution that can fully ensure confidentiality of the data transmitted between the service provider and the user while enabling the access provider to carry out the operations needed for the efficient working of his network.

3. SUMMARY OF THE INVENTION

The proposed technique at least partly resolves the problems posed by the widespread use of data encryption. Indeed, the proposed technique relates to a method for processing data implemented within a module that is intermediary between a customer module and a server module connected through a communications network. According to this technique, such a method comprises:
  a step of reception, from one among the customer and server modules, of an intermediation request identifying an operation of intermediation to be performed relative to a stream of encrypted data exchanged between the customer module and the server module;

a step of processing relative to said encrypted data as a function of said operation of intermediation.

Thus, from the operational viewpoint, the proposed technique enables intermediation on data exchanged in a secured manner in a customer-server relationship, while ensuring that the intermediary cannot access the content of this data, entirely under the control of the service provider managing the customer-server architecture formed by the customer module and the server module (typically an actor known as OTT or Over-The-Top). This enables collaborative management of this exchanged data stream such as to be satisfactory for both the provider of the customer-server architecture and the operator managing the communications network used by this architecture. In addition, this technique has limited impact on equipment used in the customer-server architecture. Indeed, the modifications to be made both on the customer module and on the server module (providing the content or the service) are minor, and the chief modification is that of changing the object of the encryption, which is no longer the customer-server connection as a whole but can be done by streaming or by object.

According to one particular characteristic, the intermediation request is implemented in the form of a data frame of said stream having a first part in which the pieces of encrypted data are transported and a second part, readable by the intermediary module, into which there is inserted a field identifying the operation of intermediation to be performed. Thus, the delegation instructions can be transported within the frames available for transporting confidential content, thus enabling the implementation of the delegation technique without substantially modifying either existing apparatuses or existing communications standards.

According to one particular characteristic, the method comprises, prior to the reception of the request for intermediation, a step for receiving a message identifying the data frame of the stream into which the field identifying the intermediation operation to be performed is inserted. Thus, the intermediary module is simply alerted to the presence of delegation instructions in the encrypted data stream.

According to one particular characteristic, the method is implemented by means of a data transmission protocol defining, in addition to the data stream within which the pieces of encrypted data are transmitted, a control stream readable by the intermediary module, within which the message is transmitted. Thus, the inherent characteristics of such a transmission protocol are used to alert the intermediary module to the permeability of a stream of encrypted data, i.e. because this stream transports, in addition to the encrypted data, delegation instructions intended for the intermediary module. According to one particular characteristic, this transmission protocol is the HTTP version 2 protocol. This makes it possible to use the properties of this particular protocol which is being increasingly used by service or content providers to implement the proposed technique.

According to one particular characteristic, the reception of the request for intermediation follows the dispatch by the intermediary module, to the customer module or to the server module, of a message requesting a delegation of intermediation. Thus, the delegation of intermediation can be done at the initiative of the intermediary (typically the operator managing the communications network in which the intermediary module is situated) while at the same time remaining under the control of the service provider managing the customer-server architecture.

According to one particular characteristic, the operation of intermediation to be performed is an enriching of the data stream, the method furthermore comprising a step for obtaining at least one piece of intermediation data and the step of processing comprises the transmission, to one among the customer module and server module, of said intermediation data in the stream of encrypted data. This enables the operator to provide the service provider with additional information on the stream of encrypted data which it would not be able to provide in an entirely encrypted connection.

According to one particular characteristic, the operation of intermediation to be performed is the storage of a content associated with the encrypted data and the processing step comprises the storage of a content identified by said intermediation request. This enables the operator to offer the service provider a service for caching certain contents that the latter proposes, for example, contents having a greater audience, to accelerate their distribution, and hence the quality of the user experience, that it would not be capable of proposing with an entirely encrypted connection.

According to one particular characteristic, the operation of intermediation to be performed is the reading of data transmitted in the stream of encrypted data and the step of processing comprises the extraction, by the intermediary module, of readable (i.e. non-encrypted) data accompanying the encrypted data within a frame of the stream conveying the encrypted data and the transmission of said readable data to an apparatus of the network using these data in an processing operation proper to the network. This enables the operator to make use of the encrypted data for its own needs, for example, to carry out measurements of audiences or to make invoicing calculations, which it would find difficult to perform with an entirely encrypted connection.

According to one particular characteristic, the operation of intermediation to be performed is the modification of data transmitted in the stream of encrypted data and the step of processing comprises the modification by the intermediary module of readable (i.e. non-encrypted) data accompanying the encrypted data within a frame of the stream conveying the encrypted data. This especially enables the operator, in collaboration with the service provider, to complete the secured content exchanged by means of the customer-server architecture, for example for stream control operations, which it would be impossible to carry out with an entirely encrypted connection.

According to another aspect, the proposed technique also relates to an intermediary module for the processing of data, capable of being used between a customer module and a server module connected through a communication network. Such a module comprises:

means for receiving, from one among the customer and server modules, of an intermediation request identifying an intermediation operation to be performed relative to a stream of encrypted data exchanged between the customer module and the server module.

means of processing associated with said stream of encrypted data as a function of said intermediation operation.

According to another aspect, the proposed technique also relates to a module, called a source module, comprising means of communication with a communications network for the transmission of encrypted data addressed to another module, called a destination module, via an intermediary module situated in the communications network. Such a module furthermore comprises means of processing capable of generating requests for intermediation identifying an intermediation operation to be performed relative to a stream of encrypted data exchanged with said destination module, the means of communication being configured for the transmission of said intermediation request to the intermediary module.

According to one particular characteristic, the processing means are furthermore capable of generating a message identifying a data frame of the stream into which there is inserted a field identifying the operation of intermediation to be performed, the communication means being furthermore configured to transmit said message to the intermediary module According to a preferred implementation, the different steps of the methods according to the invention are implemented by one or more software programs or computer programs comprising software instructions intended to be executed by a data processor of a relay module according to the invention and been designed to command the execution of the different steps of the methods.

The invention therefore also pertains to a program capable of being executed by a computer or by a data processor, this program comprising instructions to command the execution of the steps of a method as mentioned here above. This program can use any programming language whatsoever and can be in the form of source code, object code or and intermediate code between source code and object code, such as in a partially compiled form or in any other desirable form whatsoever.

The invention also relates to an information carrier readable by a data processor and comprising instructions of a program as mentioned here above. The information carrier can be any entity or device whatsoever capable of storing the program. For example, the carrier can comprise a storage means such as a ROM for example a CD ROM or a microelectronic circuit ROM (USB stick, SSD etc.), or again a magnetic recording means, for example a floppy disk or hard disk drive. Furthermore, the information carrier can be a transmissible carrier such as an electrical or optical signal that can be conveyed through an electrical cable or optical cable, by radio or by other means. The program according to the invention can be especially downloaded on an Internet type network. As an alternative, the information carrier may be an integrated circuit into which the program is incorporated, the circuit being adapted to execute or to be used in the execution of the method in question.

According to one embodiment, the invention is implemented by means of software and/or hardware components. In this respect, the term "module" can correspond in this document equally well to a software component or a hardware component or to a set of hardware or software components. A software component corresponds to one or more computer programs, one or more sub-programs of a program or, more generally, any element of a program or a software program capable of implementing a function or a set of functions according to what is described here below for the module concerned. Such a software component executed by a data processor of a physical entity (a sensor, a terminal, a server, a gateway, a router etc.) and can access the hardware resources of this physical entity (memory, recording media or carriers, communications buses, input/output electronic boards, user interfaces etc.).

In the same way, a hardware component corresponds to any element of a hardware unit capable of implementing a function or a set of functions according to what is described here below for the module concerned. It can be a programmable hardware component or a component with an integrated processor for the execution of software, for example an integrated circuit, a smartcard, a memory card, an electronic board for the execution of firmware etc. Each component of the above described system naturally implements its own software modules.

The different embodiments mentioned here above can be combined with one another to implement the invention.

4. DRAWINGS

Figure 2:
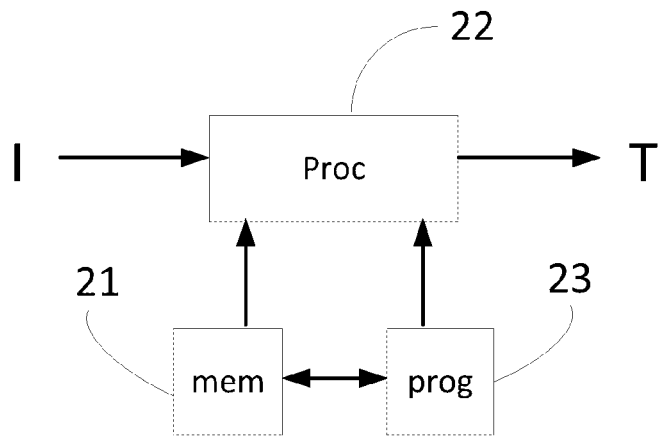
Figure 3:
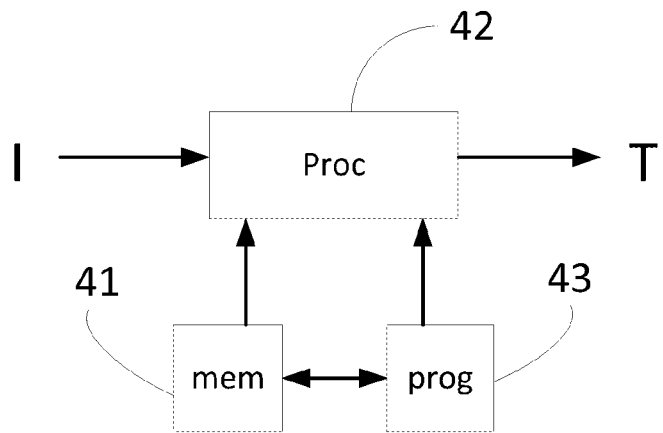

Other features and advantages of the invention shall appear more clearly from the following description of a preferred embodiment, given by way of a simple illustratory and non-exhaustive example and from the appended drawings, of which:

FIG. 1 presents the general principle of a method according to the present invention;

FIG. 2 provides a schematic view of the hardware architecture of an intermediary module according to one embodiment of the invention;

FIG. 3 is a schematic view of the hardware architecture of a customer module according to the embodiment of the invention.

Figure 4:
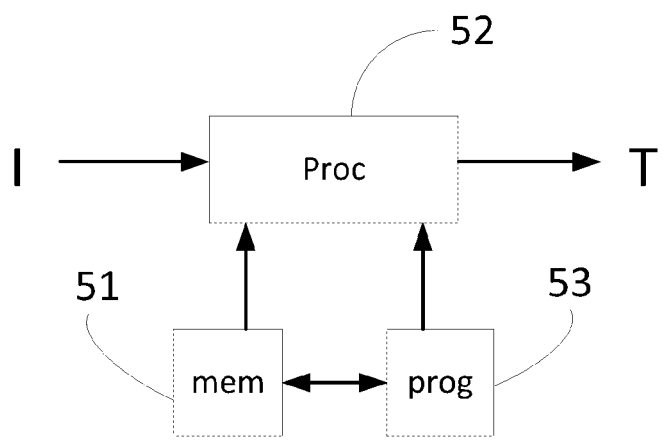

FIG. 4 provides a simple explanation of the hardware architecture of a server module according to one embodiment of the invention.

5. DESCRIPTION

5.1. General Principle of the Invention

As explained here above, the general principle of the invention makes it possible for the exchanged content (stream of data or objects) to remain encrypted from the viewpoint of both the customer module and the server module while, from the viewpoint of an intermediary module between these customer and server devices, pieces of intermediation data (for example data needed to maintain the communications network in operational condition or data needed to fulfill certain services) are accessible and can be used relative to the encrypted content. In other words, these pieces of intermediation data are the pieces of data that enable the intermediary module to fulfill its intermediation functions, which can be functions for modifying content, caching content, inserting additional data etc.

To attain this result, the encryption is not done directly by encrypting the totality of the connection between the customer module and the server module of the service provider as can be the case with the HTTPS protocol. According to the present invention, the encryption can be done on a data stream and/or on an object independently. According to the present invention, at least one stream or object among the plurality of multiplexed streams and objects can be used by the intermediary module (for example the proxy server module) to enable an intermediation. It can be the stream called a control stream. It can be an object such as a field of the header. Depending on the communications protocols used, the control stream can be a stream independent of the data streams, transmitted in parallel with the data streams, or a stream integrated into the data stream (i.e. the control stream is embedded in the data stream), or else again a combination of the above solutions can be used.

One method according to the principle of the present invention is more particularly explained with reference to FIG. 1.

This method comprises, from the viewpoint of the intermediary module MI (which can be, for example, a server called a proxy server):

the reception (step 20) of an intermediation request RIM identifying an intermediation operation to be performed relative to a stream of encrypted data exchanged between a customer module MC and a server module MS. This request can come from the customer module MC or the server module MS, as the case may be.

a processing (step 30) associated with this stream of encrypted data, as a function of this intermediation operation identified in the intermediation request RIM.

Thus, unlike in the prior art in which an encryption is carried out on the totality of the connection between the customer module MC and the server module MS at the level, for example, of the TLS layer, the proposed solution consists of the encryption of all or part of the data exchanged between the customer module and the server module while enabling the intermediary module to receive a request enabling it to intervene on this encrypted data without necessarily needing to know its content.

The term "encrypted data" is herein understood to mean simple individual pieces of data or objects (for example images or files) that have been totally or partially encrypted by one of the modules, namely the customer module MC or server module MS, called a sender, and can be decrypted by the other one of these modules, called a destination module, for example by means of encryption keys and decryption keys available in the two devices. In this case, the intermediary module is not capable of decrypting this data if it does not have such a decryption key. The "JavaScript Object Signing and Encryption" (or JOSE) technique can thus be employed.

The term "intermediation operation" is herein understood to be an action of intermediation related with encrypted data sent out in a stream that is more or less partially encrypted, the implementation of which is delegated by the sender module, MC or MS, to the intermediary module MI. The term used here is "delegation of intermediation".

This action of intermediation is associated with one or more specific data-processing operations which the destination module MI must perform with reference to these pieces of encrypted data. In certain cases, the processing corresponds precisely to the operation of intermediation to be performed (for example, when it is a simple reading or replaying of readable or replayable data accompanying the encrypted data). In other cases, the processing comprises one or more successive steps enabling the implementation of the associated operation of intermediation (for example, when it is an enriching operation, the fact of obtaining the intermediation data being used for this enrichment, and then transmitting the data to one of the modules MC or MS, as shall be seen in an example further below).

The intermediation request RIM can especially be implemented in the form of a data frame of the stream exchanged between the devices MC and MS, in which there is inserted a field (called an intermediation delegation field) identifying the intermediation operation to be performed. To identify this operation, the field can comprise an identifier of the intermediation action (enrich, read, store etc.) as well as parameters useful for this action (sense of the action, specific values to which the action applies, etc.). Such a data frame can thus comprise an encrypted part (for example, the "payload" part of the frame, either entirely or partially) into which there is inserted the encrypted data exchanged between the devices MC and MS, and an non-encrypted part (for example, a part of the header or the entire header of this frame, or even also a part of the payload of the frame) into which there is inserted this field identifying the intermediation operation, which can then be extracted by the intermediary module MI so that this module will determine the intermediation operation to be performed.

In order to enable the reception of such a request for intermediation RIM in the form of a data frame of the stream into which such an intermediation field is inserted, the preliminary reception (step 10) of a message DEL by the intermediary module MI can advantageously take place. This message DEL is advantageously sent by the same module as the one sending the intermediation request RIM and serves to inform the intermediary module MI that it will receive delegation instructions concerning an operation to be performed in an encrypted data frame of the stream, for example in a specific part (such as its non-encrypted header) of the first data frame of this stream following this message DEL. Thus alerted, the intermediary module MI can easily retrieve these delegation instructions by monitoring the stream of encrypted data travelling through it.

The processing (step 30) associated with the stream of encrypted data as a function of the intermediation operation can be one of the following processing operations:

the transmission (step 31) of a piece of intermediation data, herein designated as DIM, to the customer module MC; this corresponds for example to an operation, by the intermediary module MI, for enriching a data stream transmitted from the server module MS to the customer module MC, such as the addition of advertisements or links to suggested contents;

the transmission (step 32) of the piece of intermediation data DIM to a server module MS; this corresponds for example to the implementation of an authentication by the intermediary module MI on behalf of the server module MS, or again an operation for enriching the data stream transmitted to the server module MS with data on the state of the communications network;

the storage (step 33), within a cache memory to which the intermediary module MI has access (either because it is integrated into this device MI or because it is integrated into an apparatus connected with the device MI), of a content identified by the intermediation request RIM; this can for example be implemented as and when the content is transmitted from the server module MS towards the customer module MC, or by a direct downloading of the content by the intermediary module MI from a remote content server, or by access to another version of this content;

the storage (34), within a cache memory to which the device MI has access, of the request for intermediation RIM or a piece of intermediation data contained in a response to this request; this can for example be used to obtain statistics, comply with legal requirements and offer multiple-device user experiences;

the extraction of readable data by the intermediary module MI from within a frame of the stream transporting encrypted and readable (i.e. non-encrypted) data, this extraction corresponding to an operation for reading data transmitted in the encrypted data stream, the extracted data possibly being used by the intermediary module MI for the invoicing of the user of the customer module MI or for measuring an audience of a content. This readable data can be especially metadata associated with the data of a content, the latter being encrypted;

the modification of readable data (for example, metadata associated with encrypted data) by the intermediary module within a frame of the stream transporting encrypted and readable (i.e. non-encrypted) data, this modification corresponding to an operation for modifying data transmitted in the stream of encrypted data, useful for example in the context of a control of streams or to update information such as contextual information.

As seen here above, the intermediation operation can be an operation of enrichment using a piece of intermediation data DIM. In such an example, the method furthermore comprises the obtaining (step 25) of this piece of intermediation data DIM by the intermediary module MI. This intermediation data DIM can be obtained either directly within the intermediary module MI if it already possesses this intermediation data DIM at this stage or from external resources RE which can be other servers or entities of the communications network to which the intermediation device MI is connected, for example servers storing data on customers or again servers storing data on the state of the communications network such as data on congestion of nodes, available bandwidth etc.

To enable the customer and/or server modules to delegate an operation of intermediation to the intermediary module while at the same time carrying out an exchange of encrypted data, the intermediation request RIM is transmitted in a non-encrypted way and therefore in a way that can be interpreted by the intermediary module MI, unlike the content exchanged between the devices MS or MC. In particular, this intermediation request RIM can be implemented in the form of a data frame of the stream, having a first part (a part of the payload or the entire payload of the frame) in which the pieces of encrypted data are transported and a second part (a part of the header or the entire header, or even also a part of the payload of this frame), readable by the intermediary module MI in which there is inserted the field identifying the intermediation operation to be performed.

Inasmuch as such a data frame of the stream is used as an intermediation request RIM, the method then advantageously comprises, prior to the reception (in step 20) of the intermediation request RIM, a step of reception (step 10) of a message DEL identifying the data frame of the stream into which there is inserted the field identifying the intermediation operation to be performed.

In particular, it is possible here to use a data transmission protocol defining, in addition to the data stream within which the pieces of encrypted data (and therefore the intermediation request RIM) are transmitted, a control stream readable by the intermediary module within which this message DEL can be transmitted. This is especially the case of the HTTP version 2 transmission protocol which stipulates a signaling stream (stream #0) supporting the transmission of non-encrypted "control" frames as well as the presence of other streams supporting the transmission of "data" frames that can contain encrypted data as well as non-encrypted data.

5.2. Description of Embodiments of the Invention

In the embodiments described here below, the HTTP protocol version 2 is considered for the connection between the customer module MC and the server module MS via the intermediary module MI. An HTTP2 connection comprises especially a signaling stream (called "stream 0") and one or more data streams (called "stream 1", "stream 3", etc.) created as and when this connection is used for data exchanges, theses streams being multiplexed, i.e. they are transmitted and/or received concertedly within the HTTP2 connection. However, other transport protocols such as QUIC, SCTP, UDP, RTP, TCP, can also be envisaged.

In these embodiments, the intermediation delegation is implemented by means of an extension to the HTTP2 protocol, herein called "SPOC" (security and permeability of objects and connections).

In the HTTP2 protocol, as defined presently, the frames are either of the control frame type or of the data frame type. The range of these frames is variable: they can be end-to-end or hop-by-hop (from node to node). The proposed method enables permeability of the objects and connections by the inserting of instructions on delegations of handling operations (re-directing, reading, enrichment, modification etc.) in the HTTP2 connection.

The instructions of intermediation are transmitted by the "user agent" of a customer module or a server module. They make it possible to determine the delegations of handling and the operational mode for processing data ("read, write, add, re-direct, cache") by the intermediary module. The delegation instructions as well as the SPOC values that result from them are transmitted in data frames. However, in order that the different actors (customer, server, proxy) may be alerted to the presence of delegation instructions and SPOC values, a specific field of a control frame is used, herein one bit of the "Flags" field with a length of 8 bits of the header common to all the HTTP2 frames, especially the header type frame.

5.2.1 Processing of Intermediation Data for the Purpose of Enriching a Request for Creating Encrypted Data Streams In this first embodiment, the intermediary module MI is a proxy acting to add information to the information transmitted by a customer application installed in a customer module MC, intended for a server module MS. More particularly, in this first embodiment, the customer module MC requests the server module MS to send it a multimedia stream.

In this first embodiment, the exchanges are made in an HTTP2 connection by means of a stream of encrypted data between the customer module MC and the server module MS. The customer application (i.e. the user agent installed in the device MC) sends the proxy (i.e. the intermediary module MI), an intermediation request identifying an intermediation operation corresponding to an enriching of this stream, with intermediation data corresponding here to an "userID" identifier of the account of the user of the customer module MC, a "partnerID" identifier of a sponsor B2B, or both these identifiers. Such an intermediation request can take the form of a data frame of the stream in which there is inserted the next "SPOC" field, containing a number of pieces of delegation information, especially the operation of intermediation to be performed ("enrich") and the sense of transmission of the data frame

```
("request"): spoc_b2b : {
    ,operation: {action:'enrich', direction: 'request' }
    ,information: {auth:'53R569767', wholesale: ["userID",
    "partnerId" ]}
    }
```

After having received this request for intermediation and extracted the "SPOC" field here above, the proxy is informed that it must enrich the data stream by inserting the required intermediation data (user ID and partner ID) into the received data frame and then transmit this frame to the server module MS. This insertion can be implemented by replacing, in this data frame, the "SPOC" filed here above by the following intermediation data field:

{information: {wholesale: {userID: '43Z54G5', partnerId: 'FGF40'}}}

The server module MS then receives this data frame and extracts from this frame the user and/or sponsor identifiers which it can then use to process and provide the streaming service stipulated by contract.

In this first embodiment, the proxy is connected to a customer information system and by this means obtains information on the user such as his UserID identifier, for example from the IP address of the customer module MC.

The sending by the device MC of the intermediation request in the form of a data frame containing a SPOC field herein follows the preliminary dispatch by the MC device of a control frame enabling the proxy to identify the intermediation request, in a control stream distinct from the data stream. The sequencing here is as follows:

1) the application installed on the customer module carries out a request 'http1.1 GET example.com/auth';
2) the HTTP2 stack then transmits a "headers" type HTTP2 control frame in the stream 0 (i.e. a control stream) to create a data stream, for example the stream 23 (a value chosen arbitrarily in this example). In a "headers" type frame, the customer application has inserted an SPOC flag informing the proxy that the stream 23 is "permeable", i.e. that the first data frame transmitted by the customer module in this stream 23 corresponds to an intermediation request indicating an operation to be performed.
3) The customer module transmits a first "data" type HTTP2 frame in this stream 23, this data frame containing the delegation information described here above;
4) The proxy receives the "headers" frame on the stream 0 and redirects it towards the server module while at the same time thus determining that the stream 23 is permeable;
5) After having received the first "data" frame containing the above-described "SPOC" field in the stream 23, it replaces this "SPOC" field by the intermediation data described here above to enrich this stream 23;
6) The server module MS receives the "headers" frame and detects the "SPOC" flag. It deduces from this that it must reach the first "data" frame on the stream 23 to find therein the intermediation data to be exploited.
7) The server module MS then receives the first data frame containing the enriched SPOC message. From this it extracts the "userID" and "partnerID" identifiers used to determine the user and the contract concerned, thus enabling it to provide the streaming service stipulated by the contract to the customer application installed in the customer module MC.

Similarly, the server module MS can authorize the proxy to "enrich" the data frames that it transmits in the stream 23 in response to the request coming from the customer module. In this case, it is the server module MS which transmits an intermediation request to the proxy in the form of a data type frame, in the header of which there is inserted a "SPOC" flag enabling a proxy to be informed of the presence of delegation information and in which there is also inserted a "SPOC" delegation field which is not taken into account by the encryption integrity check, for example in the following form:

```
spoc_b2b : {
 ,operation: {action:'enrich', direction: 'response'}
 ,where: {stream: 23, frameType: 'DATA', index: 2, number: 4}
}
```

The proxy obtains information to be inserted (received advertisements, playlist etc.) from the information system to which it is connected or from another source. When it receives the data type frame coming from the server module, the proxy detects the "SPOC" flag and extracts the "SPOC" field here above from the stream 23. It then has a determined number of data frames (for example 4) to transmit a piece of information intended for the customer module MC (for example a playlist).

5.2.2. Processing of Insertion of Network Performance Information by the Proxy

In this second embodiment, the content of the data streams between a customer module (herein a terminal) and a server module (herein a server of Akamai contents) is encrypted and transmitted in the form of a data stream in an HTTP2 connection. Here it is the server module that initiates the treatment in transmitting an intermediation request in unencrypted form to the proxy so that the proxy inserts performance information (QoS, delay) into a stream then created between the customer module and the server module without the proxy's needing to know the nature and type of encrypted content.

The proxy and the server module are in an HTTP2 connection, the exchanged data being encrypted end to end, the customer module and the server module detecting any non-integrity of these exchanges. The content of the "headers" type control frames is however not encrypted.

The proxy is interfaced with the system for monitoring the communications network operator's landline and mobile access networks.

The server module sends the proxy a request for intermediation designating an operation of intermediation to be performed, corresponding to a delegation of insertion of information, so that the proxy sends it the delay of transmission from the access network (in milliseconds) for each new request directed towards a content (for example, a television channel) sent by the customer module MC. The "SPOC" field inserted into the data frame implementing this intermediation request can take the following form:

```
spoc_qoe : {
 scope: {path :'akamai.com/tf1/replay/*', method : 'get', scheme : 'http'}
 ,operation: {action:'enrich', direction: 'request' }
 ,information: {type : 'qos', delay : 'ms', bandwidth : 'kbytes', area :
'backhaul'}
}
```

The delegation of insertion pertains to future requests to a set of URLs.

The proxy receives this request for delegation of insertion and can extract the SPOC field from the data frame so that the field is not communicated to a user-agent (because otherwise this could give rise to errors at this user-agent level). The proxy stores and activates this delegation of insertion for all the requests towards 'akamai.com/tf1/replay/*' made by the user-agents connected to the proxy.

When a user-agent of a customer module then requests access to 'akamai.com/tf1/replay/*', his HTTP2 stack transmits a headers frame to create a stream #45 (an arbitrarily chosen value) of data frames. Upon reception of a "headers" frame to an URL belonging to the unit defined here above (the proxy examining the "headers" fields), which is the case of this frame creating the stream #45, the proxy adds a "SPOC" flag thereto and transmits the "headers" frame thus modified to the server module. It then interrogates the monitoring system and obtains the performance of the access network for this particular user-agent. The proxy inserts a "SPOC" field into a data frame of the stream #45, this "SPOC" field containing information on the performance of the access network of this user-agent, for example in the following form:

{type: 'qos', delay: 20, bandwidth: 1000})

The server module receives the HTTP2 "headers" frame having the SPOC flag. It identifies the encoding levels available for the requested content, pending information on performance. It then receives the «data» frame containing the SPOC message (and hence the network performance values), enabling it to provide the desired content with the encoding level adapted to the performance indicated.

Two modes of implementation can be envisaged:

Implementation 1:

In this first implementation, the proxy has means available to decompress and analyze all the headers received. It keeps the tables of headers up to date as stipulated under the HTTP2 specification. It therefore knows the fields of the headers exchanged.

The server module transmits a delegation of insertion to the proxy on the stream #0 in a "headers" frame having the "SPOC" flag. The proxy then activates the delegation. It adds the "SPOC" flag to a headers frame and transmits it to the server module. The proxy interrogates the monitoring system of the network and inserts a "data" type HTTP2 frame into the #45 stream, this frame having the flag SPOC and containing information on the performance of the access network of this user-agent (for example information: {type: 'qos', delay: 20, bandwidth: 1000}), this insertion being done in the SPOC delegation field of a first data type frame sent out by the server module in the stream #45.

Implementation 2:

In this other implementation, the proxy does not have means available to decompress and analyze all the headers. It therefore does not have knowledge of the fields of the headers exchanged.

In this case, the server module receives the headers HTTP2 frame creating the stream and requesting for example access to a resource ("akamai.com/tf1/replay/lost/season5/episode34"). The server module then transmits a SPOC field of delegation in a first data type message of the stream 45 in which it has taken care to insert a SPOC flag. The SPOC field can take the following form:

```
spoc_qos : {
,operation: {action:'enrich', direction: 'response' }
,information: {type : 'qos', delay: 'ms', bandwidth : 'kbytes', area : 'backhaul'}
}
```

Pending the arrival of QoS information, the server module prepares its processing operation.

The proxy receives and extracts the SPOC field of delegation, coming from the server, from the data frame of the stream 45. The proxy interrogates the monitoring system of the network and inserts a data type HTTP2 frame into the stream 45 going towards the server, this frame having the SPOC flag and containing the information on the performance of the access network of this user-agent (example information: {type: 'qos', delay: 20, bandwidth: 1000}).

The server module receives these pieces of intermediation information and supplies the content in data frames of the stream #45 with an encoding level adapted to the performance values indicated. The proxy relays these data frames to the customer module.

5.2.3. Processing of Caching of Contents

In this third embodiment, the content of the data streams between a customer module (for example a terminal) and a server module is encrypted and transmitted in the form of individual streams in an HTTP2 connection.

Here it is the proxy that initiates the process in sending the server module a message requesting a delegation of intermediation to carry out caching of content. If it agrees with this request, the server module returns an intermediation request, in unencrypted form, to the proxy so that the proxy stores the content (either from a FTP server module or on the fly as shall be seen further below) without the proxy needing to know the nature or type of content cached (all it knows is that the URL of this content has a high audience and therefore can benefit from caching at the level of the proxy).

Two modes of implementation can be envisaged:

Implementation 1:

The data streams exchanged between the customer and server devices are encrypted individually. The content of the header messages is not encrypted. The proxy has available a cache memory to which it has access. It measures the audience of each URL as a background task and determines, on this basis, whether it is appropriate to store the contents of a URL (for example http://akamai.com/lost/episode34), for example when the number of requests for this URL surpasses a popularity threshold.

A customer module asks for this URL in a "headers" frame requesting the creation of a new stream #56 (an arbitrarily chosen value). The proxy inserts a request into this frame for delegation of intermediation, for the caching of this content in the form of the following SPOC field:

```
spoc_caching : {
operation: {action: 'caching', direction: 'response' }
}
```

The server module receives the HTTP2 headers control frame creating the stream #56 having a SPOC flag. It identifies the requested content. It then receives, on the stream #56 a data frame containing the above SPOC field, requesting it to delegate a caching operation at the proxy level.

If the server module accepts this request, it sends the proxy a SPOC field in a first data type frame of the stream #56, detailing the mode of ingestion and delivery (size, encryption etc.) of the content, as indicated here below:

```
spoc_caching : {
ingestion: {
mode: 'out-of-band';
location: {path:'srv3.akamai.com/JHSDFSDF35SDF', scheme : 'ftp'}
}
}
```

The proxy extracts the SPOC field from the stream 56. It interprets it, and then downloads the content from the address indicated (in this case the server srv3.akamai.com/JHSDFSDF35SDF) in FTP, and memorizes it in the cache memory.

The proxy can then directly transmit the content when it receives a new request towards the URL http://akamai.com/ lost/episode34, without the server module's needing to provide this content gain and without the proxy's knowing the nature of this content (it only knows the URL). Downloading from another server (in this case an FTP server) is a simple solution for contents for which the storage is not transient, or for which transmission from the server module MS is complex.

Implementation 2:

This is a variant of the implementation 1 where the server module provides the content in the stream #56 and where the proxy stores this content as and when the content of the server module is transmitted to the customer module.

In this case, the server module sends the proxy a SPOC field in a first data type frame of the stream #56, detailing the format of the content and its mode of ingestion and delivery (size, encryption etc.) as indicated here below:

```
spoc_caching : {
    ingestion: {
        mode: 'in-band';
        ,format: 'object'
        ,encryption: 'JOSE'
    }
}
```

Uploading along with the flow is a simple solution for contents that can be directly cached.

The two SPOC fields here above do not contain information describing the mode of delivery of the content. However, in certain cases, the server module will have to provide them, for example if by choice the server module provides a content that is encoded differently (for example if, for business and contractual reasons, the server module provides an SD version to the proxy while it delivers an HD version to the end customers module), or again if the proxy is far too simple to capture the detail of the delivery mode used. This is the case for example with the "DASH" delivery system requesting a manifest file of which the proxy does not even have any knowledge. In this case, the following field is added:

```
delivery: {
    ,addon: {path:'srv3.akamai.com/lost.txt'}
}
```

5.3. Other Aspects and Advantages

Referring to FIG. 2, a description is provided of an intermediary module MI when it is implemented within a device called an intermediary device such as a proxy server according to one embodiment of the present invention.

Such an intermediary device comprises a memory 21 constituted for example by a buffer memory and a processing unit 22 equipped for example with a microprocessor.

The intermediary module MI can then take the form of a computer program 23 implementing the processing method as described here above. At initialization, the code instructions of the computer program 23 are for example loaded into a memory of the device and then executed by the processing unit 22. The processing unit 22 inputs at least one piece of data representing an intermediation request RIM. The processing unit 22 then implements the stages of the processing method according to the instructions of the computer program 23 to carry out a processing operation adapted to the content of this intermediation request RIM and especially a field identifying an operation to be performed contained in this request.

To this end, the device implementing the module MI comprises, in addition to the memory 21, communications means (not shown) such as a network communications interface capable of receiving and transmitting data on streams with a customer module MC and a server module MS.

The module MI can then comprise means for obtaining intermediation data DIM from devices connected to the intermediary device by means of a communications network. These means can take the form of a particular processor implemented within the device, the processor being a secured or redundant processor. According to one particular embodiment, this device implements a particular application which is in charge of processing the data.

Referring now to FIG. 3, a description is provided of a customer module MC according to one embodiment of the present invention in which this module MC is implemented within a device called a customer device such as a terminal. It may be, among others, a customer application installed on a mobile terminal.

Such a customer device comprises mainly a memory 41 constituted for example by a buffer memory and a processing unit 42 equipped for example with a microprocessor.

The customer module MC can then take the form of a computer program 43 implementing the preparation of the intermediation request RIM intended for the intermediary module MI as well as the message DEL enabling its identification within a stream of encrypted data. At initialization, the code instructions of the computer program 43 are for example loaded into a memory of the customer device and then executed by the processing unit 42.

To prepare the message DEL, the processing unit 42 inserts a flag into a frame of a non-encrypted control stream addressed to a server module MS, this flag enabling the identification of the presence of an intermediation request RIM in an encrypted data stream intended for this server module MS as well as an identifier of this data stream. To prepare the intermediation request RIM, the processing unit 42 inserts a field, into a non-encrypted part of a data frame carrying encrypted data addressed to the server module MS, this field identifying an intermediation operation.

The customer device additionally comprises a communications module (not shown) such as a communications interface enabling exchange of data with the server module MS, via the intermediary module MI on a communications network. This communications module receives the message DEL and the intermediation request RIM prepared by the processing unit 42 to transmit them to the intermediary module MI.

Referring now to FIG. 4, we describe a server module MS according to one embodiment of the present invention in which this module MS is implemented within a device, called a server device, such as a server providing contents or services. It may be, among others, a server application installed on a device of a service provider.

Such a server device comprises especially a memory 51 constituted for example by a buffer memory and a processing unit 52 equipped for example with a microprocessor. The server module MS can then take the form of a computer program 53 implementing the preparation of the intermediation request RIM intended for the intermediary module MI as well as the message DEL enabling its identification within a stream of encrypted data. At initialization the code instructions of the computer program 53 are for example loaded into a memory of the server device and then executed by the processing unit 52.

To prepare the message DEL, the processing unit 52 inserts a flag into a frame of a non-encrypted control stream intended for a customer module MC, the flag being used to identify the presence of an intermediation request RIM in an encrypted data stream addressed to this customer module MC as well as an identifier of this data stream. To prepare this intermediation request RIM, the processing unit 52 inserts a field into a non-encrypted part of a data frame conveying encrypted data addressed to the customer module MC, a field identifying an intermediation operation.

The server device additionally comprises a communications module (not shown) acting as communications interface for the exchange of data with the customer module MC via the intermediary module MI on a communications network. This communications module receives the message DEL and the intermediation request RIM prepared by the processing unit 52 to transmit them to the intermediary module MI.

Naturally, the invention is not limited to the exemplary embodiments described and represented here above, on the basis of which it is possible to provide for other embodiments and other forms of embodiments without in any way departing from the framework of the invention.

Thus, the customer modules, intermediary modules and server modules have been described here above in the form of distinct devices. However, it is possible that certain of these modules may be installed in the same device. This may be especially the case when the customer module is an Internet browser installed on a terminal (a mobile terminal for example) and the intermediary module is a plug-in or an add-on of this browser, installed on this same terminal. This is also the case when the customer module is a customer application installed on a terminal (mobile for example) and the intermediary module is an SDK of this application installed on this same terminal.

The invention claimed is:

1. A method for processing data, implemented within an intermediary module between a customer module and a server module connected through a communications network and communicating via a data transmission protocol, the data transmission protocol defining a control stream readable by the intermediary module, in addition to a data stream of encrypted data exchanged between the customer module and the server module, the control stream being independent and distinct from the data stream and transmitted in parallel of the data stream, wherein the method comprises the following acts:
   receiving a message identifying a data frame of said data stream of encrypted data, said data frame comprising an intermediation request identifying an intermediation operation to be performed relative to said data stream of encrypted data, said message being transmitted within said control stream;
   after the reception of said message, receiving, from one among the customer and server modules, the data frame identified by the message, said data frame having:
      a first part in which pieces of the encrypted data, whose content is not accessible by the intermediary module, are transported; and
      a second part forming said intermediation request, readable by the intermediary module, the second part comprising a field identifying the intermediation operation to be performed; and processing relative to said encrypted data as a function of said operation of intermediation said field identifying the intermediation operation to be performed.

2. The method for processing according to claim 1, wherein the transmission protocol is the HTTP version 2 protocol.

3. The method for processing data according to claim 1, wherein the act of receiving the intermediation request follows an act of transmitting, by the intermediary module, to the customer module or to the server module, a message requesting a delegation of intermediation.

4. The method for processing data according to claim 1, wherein the intermediation operation to be performed is an enrichment of the data stream, the method furthermore comprising an act of obtaining at least one piece of intermediation data and wherein the act of processing comprises transmitting, to one among the customer and server modules, said piece of intermediation data in the stream of encrypted data.

5. The method of processing according to claim 1, wherein the intermediation operation to be performed comprises storing a content associated with the encrypted data, wherein the act of processing comprises storing content identified by said intermediation request.

6. The method of processing according to claim 1, wherein the intermediation operation to be performed comprises reading data transmitted in the data stream of encrypted data, wherein the act of processing comprises extracting, by the intermediary module, readable data accompanying the encrypted data within a frame of the data stream conveying the encrypted data and transmitting said readable data to an apparatus of the network using said readable data in a processing operation proper to the network.

7. The method of processing according to claim 1, wherein the intermediation operation to be performed comprises modifying data transmitted in the data stream of encrypted data, wherein the act of processing comprises modifying by the intermediary module readable data accompanying the encrypted data within a frame of the data stream conveying the encrypted data.

8. An intermediary module for processing data, capable of being used between a customer module and a server module connected through a transmission network and communicating via a data transmission protocol, the data transmission protocol defining a control stream readable by the intermediary module, in addition to a data stream of encrypted data exchanged between the customer module and the server module, the control stream being independent and distinct from the data stream and transmitted in parallel of the data stream, wherein the intermediary module comprises:
   a non-transitory computer-readable medium comprising instructions stored thereon; and
   a processor configured by the instructions to perform acts comprising:
   receiving a message identifying a data frame of said data stream of encrypted data, said data frame comprising an intermediation request identifying an intermediation operation to be performed relative to said data stream of encrypted data, said message being transmitted within said control stream;
   after the reception of said message, receiving, from one among the customer and server modules, the data frame identified by the message, the data frame having:
      a first part in which pieces of the encrypted data, whose content is not accessible by the intermediary module, are transported; and a second part forming said intermediation request, readable by the intermediary module, the second part comprising a field identifying the intermediation operation to be performed; and processing associated with said stream of encrypted data as a function of said intermediation operation, said field identifying the intermediation operation to be performed.

9. A source module comprising:

a non-transitory computer-readable medium comprising instructions stored thereon; and a processor configured by the instructions to perform acts comprising:

communicating via a data transmission protocol with a communications network for transmission of a data stream of encrypted data addressed to a destination module, via an intermediary module situated in the communications network, the data transmission protocol defining a control stream readable by the intermediary module, in addition to the data stream of encrypted data, the control stream being independent and distinct from the data stream and transmitted in parallel of the data stream;

generating a message identifying a data frame of said data stream of encrypted data, said data frame comprising an intermediation request identifying an intermediation operation to be performed relative to said data stream of encrypted data, and wherein the act of communicating further comprises transmitting said message to the intermediary module, said message being transmitted within said control stream; and generating said data frame, the data frame having:
  a first part in which pieces of the encrypted data, whose content is not accessible by the intermediary module, are transported; and
  a second part forming said intermediation request, readable by the intermediary module, the second part comprising a field identifying the intermediation operation to be performed,
  wherein the act of communicating comprises transmitting said data frame to the intermediary module, after the transmission of said message to the intermediary module.

10. A non-transitory computer-readable medium comprising program code instructions for executing a method for processing, when the instructions are executed on a processor of an intermediary module, which is located between a customer module and a server module that are connected through a communications network and that communicate via a data transmission protocol, the data transmission protocol defining a control stream readable by the intermediary module, in addition to a data stream of encrypted data exchanged between the customer module and the server module, the control stream being independent and distinct from the data stream and transmitted in parallel of the data stream, wherein the instructions configure the intermediary module to perform acts comprising:

receiving a message identifying a data frame of said data stream of encrypted data, said data frame comprising an intermediation request identifying an intermediation operation to be performed relative to said data stream of encrypted data, said message being transmitted within said control stream;

after the reception of said message, receiving, from one among the customer and server modules, the data frame identified by the message, the data frame having:
  a first part in which pieces of the encrypted data, whose content is not accessible by the intermediary module, are transported; and
  a second part forming said intermediation request, readable by the intermediary module, the second part comprising a field identifying the intermediation operation to be performed; and processing relative to said encrypted data as a function of said intermediation operation, said field identifying the intermediation operation to be performed.

11. The method of processing according to claim 1, wherein the encryption of all or part of the data exchanged between the customer module and the server module while enabling the intermediary module to receive a request enabling the intermediary module to intervene on the encrypted data without knowing the content of the encrypted data.

12. The method of processing according to claim 1, wherein the data stream of encrypted data remains encrypted from the viewpoint of both the customer module and the server module.

* * * * *